April 6, 1948.　　　T. F. HORAN　　　2,439,298
CASTING REEL
Filed Oct. 3, 1944　　　2 Sheets-Sheet 1
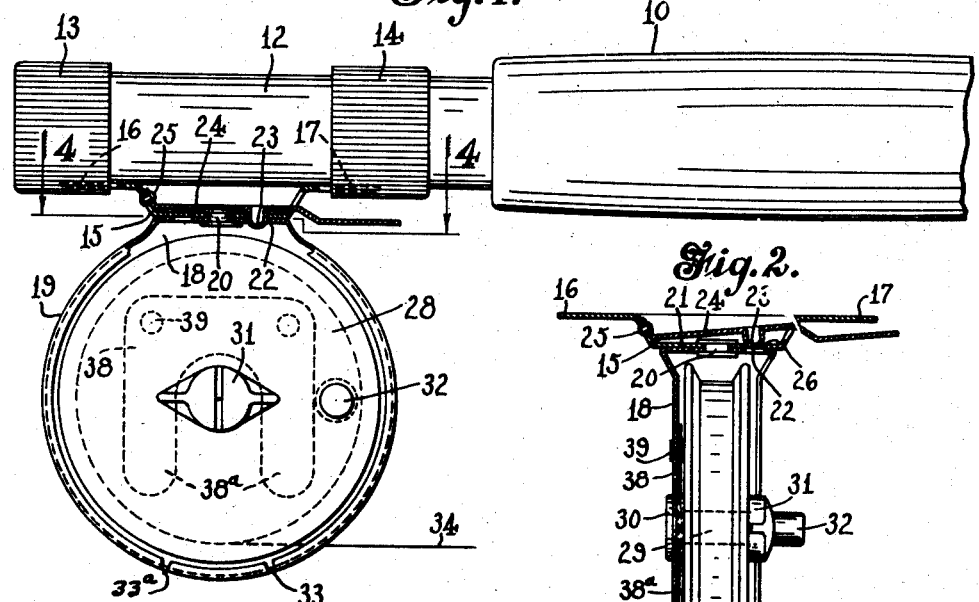
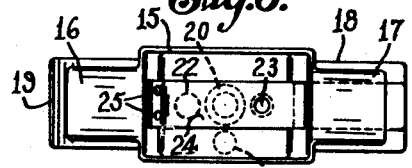
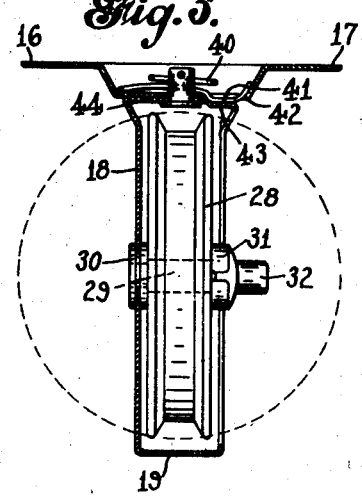
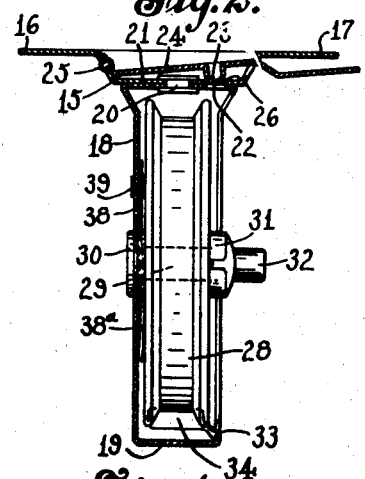
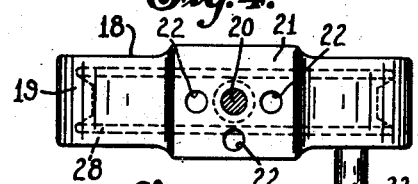
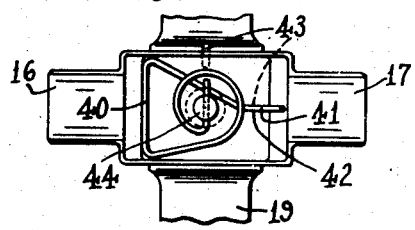
Inventor
Timothy F. Horan
By Rockwell & Bartholow
Attorneys

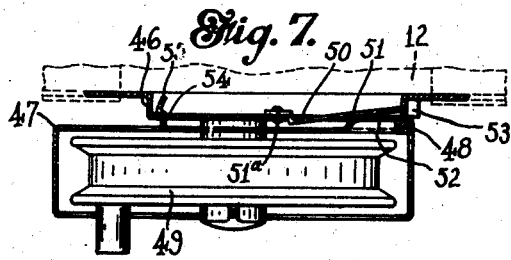
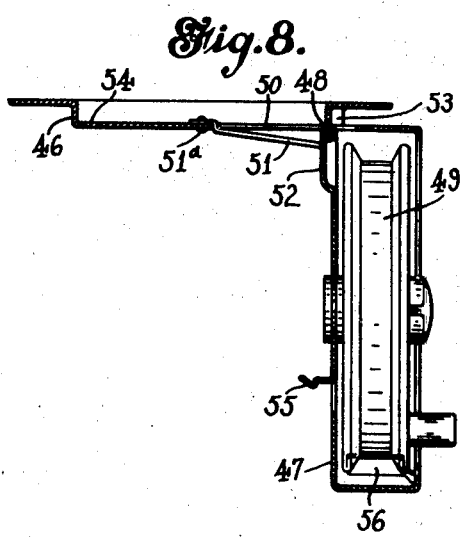
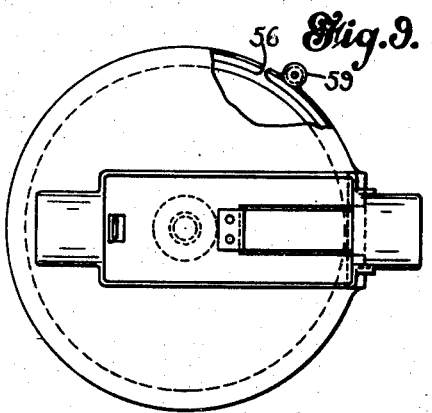
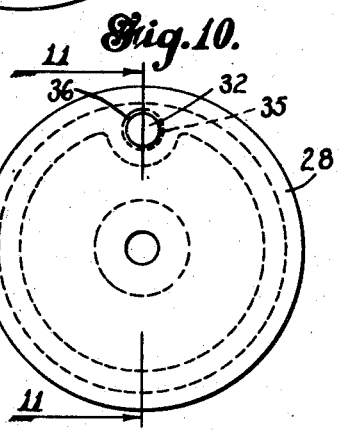
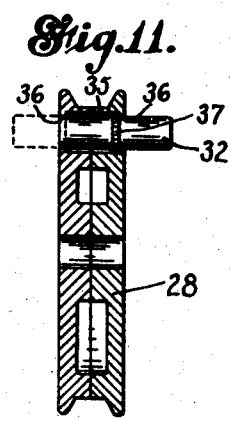
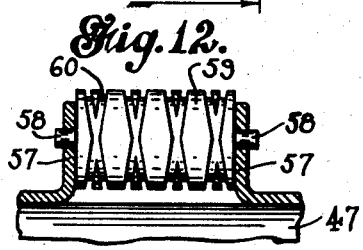

Patented Apr. 6, 1948

2,439,298

UNITED STATES PATENT OFFICE 2,439,298

CASTING REEL

Timothy F. Horan, New Haven, Conn.

Application October 3, 1944, Serial No. 556,974

2 Claims. (Cl. 242—84.1)

This invention relates to fishing reels and more particularly to one of the type called a "spinning" reel, so arranged that during casting operations or when the line is paying off the reel, the line will "spin" around the reel, the latter remaining stationary.

It is, however, inconvenient for the user to reel in the line by means of a crank handle attached to the spool in this arrangement and, therefore, in some instances the crank has been arranged in a plane transverse to that of the spool and connected to the spool by gearing.

It is contemplated by the present invention to provide a spinning reel of very simple construction and which may be manufactured economically. To this end the spool is arranged so that it may be mounted to swing or pivot upon the rod (this movement, of course, being in addition to its rotary winding motion) so that it may swing from the position of the ordinary reel, that is, a position in which the spool axis is transverse to the rod, which is the normal winding or "reeling-in" position, to a position in which its axis is transverse to the rod to which it is attached, in which latter position the line may be payed off the reel by spinning around the edge of the same, the reel itself remaining stationary.

One object of the invention is to provide a new and improved casting reel.

To these and other ends the invention consists in the novel features and combinations of parts to be hereinafter described and claimed.

In the drawings:

Fig. 1 is a side elevational view of a reel embodying my improvements secured to the handle of a fishing rod, the reel being shown in "reeling-in" position;

Fig. 2 is a longitudinal sectional view of the supporting means for the spool, the latter being shown in elevation in casting position;

Fig. 3 is a top plan view of the reel structure;

Fig. 4 is a sectional view on line 4—4 of Fig. 1;

Fig. 5 is a view similar to Fig. 2 but showing a slightly modified construction;

Fig. 6 is a top plan view of the structure shown in Fig. 5;

Fig. 7 is a sectional view of a reel construction of modified form, the spool being shown in elevation;

Fig. 8 is a view similar to Fig. 7 showing the spool in "spinning" position;

Fig. 9 is a top plan view of the reel shown in Fig. 7;

Fig. 10 is an elevational view of the spool;

Fig. 11 is a sectional view on line 11—11 of Fig. 10; and

Fig. 12 is a detailed view of the level winding device shown in Fig. 9.

To illustrate an embodiment of my invention I have shown in Fig. 1 of the drawings a portion of a casting rod 10 having a handle 12 provided with the usual rings or ferrules 13 and 14, at least one of which is movable or slidable upon the handle 12 in order to clamp the reel thereto.

The reel structure comprises a rod attaching bracket having a body portion 15 and attached lugs 16 and 17. The latter are adapted to be slipped under the rings 13 and 14 and to be held thereby snugly against the rod handle 12 while, as will be seen from Figs. 1 and 2, the body portion 15 is depressed from the attaching lugs so as to leave some space between it and the rod handle.

Pivotally secured to the body portion 15 of the attaching bracket is a spool support or case consisting, as shown, of a cup-shaped member having an end wall 18 and a peripheral cylindrical wall 19, this member being open in the front or at the position opposite the rear or end wall 18. This supporting member is pivoted to the body portion of the attaching bracket by a rivet or other suitable pivot pin 20 so that it may be rotated about this pin as an axis.

The peripheral wall of the cup-shaped supporting member is displaced outwardly to a slight extent and flattened as shown at 21 so as to lie flatly against the body portion 15 of the attaching bracket, and in this flat portion 21 are provided a plurality of openings 22 designed to receive a boss 23 upon a resilient catch member 24 secured at one end as at 25 to the attaching bracket. The body portion 15 of the bracket is provided with an opening 26 which registers with the boss 23 and allows this boss to protrude therethrough to engage in one of the openings 22 so as to releasably hold the spool support 18 in any of three adjusted positions. It will, of course, be understood that the member 24 is so tensioned that the boss 23 tends to spring outwardly to a protracted position or the position to engage in the openings 22.

Rotatably mounted upon the rear wall 18 of the support structure is the reeling spool 28, this spool being mounted upon a pin or axle 29 which is threadingly engaged with a nut 30 secured to the wall 18. On the outer end of the pin 29 is a head 31 provided with laterally extending wings by which the pin 29 may be unscrewed from the nut and removed so that the spool 28 may be readily removed and replaced when desired.

The spool is provided with a crank handle 32 by which it may be rotated to reel in the line, and the case or reel support is provided in the peripheral wall 19 with a slot 33 through which the line 34 will be drawn during the reeling-in operation. The handle 32 is preferably of the form shown in Figs. 10 and 11 of the drawings. As there illustrated, the spool 28 is provided with a passage 35 having restricted end openings 36, and the crank handle 32 is provided with an annular rib or shoulder 37 designed to slide freely within the passage 35 but which is too large to pass through the restricted end openings 36 of this passage. It will be seen, therefore, that the handle 32 may be moved from its full line position to the dotted line position shown in Fig. 11 so that it may project from either face of the spool. It will, therefore, be obvious that when the pin or axle 29 is unscrewed from the nut 30, the spool, if desired, may be removed and reversed in position so as to prevent the accumulation of twists in the line.

Between the end wall 18 of the spool case and the adjacent face of the spool 28 a spring member 38 is mounted, this member being secured to the case by rivets or the like 39. The member 38, as shown in Fig. 1, is provided with freely depending spaced leg portions 38ª, which are resilient and slightly bowed toward the adjacent face of the spool so as to press frictionally thereon and retard or place a drag upon the free rotation of the spool. This will normally prevent the spool from rotating when the line is spinning therefrom.

As shown in Fig. 1, the spool axis is transverse to the length of the rod and in this position the line may be reeled in by rotation of the spool by the handle 32, the line passing through the slot 33 in the peripheral wall 19, thus the reeling in of the line is performed in the usual manner. However, when it is desired to cast, the user will raise the catch member 24 thus disengaging the boss 23 from the opening 22 and swing the spool support or catch 16 through an angle of substantially 90° from the position shown in Fig. 1 to the position shown in Fig. 2 in which the spool axis is substantially parallel with the reel. Upon release of the catch member 24, the boss 23 will automatically enter the other of the openings 22 thus releasably securing the reel in its casting position shown in Fig. 2. During the casting operation the reel will pay off through the open face of the supporting member or case of the spool and will "spin" about the edge of the spool, the latter remaining stationary, although it can rotate, of course, if the friction of the line therewith should be sufficient to cause rotation. After the casting operation is effected, the user will again lift the catch member 24 and return the case and spool to the position shown in Fig. 1 in which it will again be retained by the engagement of the boss 23 in the other of the openings 22.

It may be noted that in Fig. 4 of the drawings three of the openings 22 are provided in the flat portion 21 of the attaching bracket, and that two of these openings are opposite each other or substantially 180° apart with respect to the pivot or axis 20 about which the spool and reel support may swing. If desired, therefore, the user, after casting with the reel in the position of Fig. 2, may turn the spool in either direction. That is, he may turn it back to the original position shown in Fig. 1 or may turn it through a further angle of 90° to a position 180° from that shown in Fig. 1. In the latter case, he would probably reel in with his left hand as the handle 32 would be on the side of the reel opposite that shown in Fig. 1. By reeling in with first one hand and then with the other an accumulation of twists in the line would be avoided as the result would be the same as if the spool were removed from the support and replaced in a reverse position as explained above. In the event that the reel is turned through an angle of 180°, a second slot 33ª may be provided to receive the line or, if desired, one slot at the lower portion of the reel case may be made of sufficient extent to receive the line regardless of whether the reel is wound at the right- or left-hand side of the rod.

In the modified form of my invention shown in Figs. 5 and 6 of the drawings, the structure is the same as that previously described with the exception of the means for releasably holding the reel in its adjusted position with relation to the bracket. In this instance, a spring member 40 is provided within the body portion 15 of this supporting bracket, this spring having a looped portion 41 extending downwardly through an opening 42 in the bracket so as to project therefrom. This looped portion 41 of the spring is designed to engage in notches or recesses 43 disposed upon the flat portion 21 of the spool case and thus hold the latter in adjusted positions. The tension of the spring member 40 is such that it will be moved out of notches 43 automatically by a rotating force applied to the spool case so that no additional operation is required to move this spring to disengaging position. Likewise, it will automatically snap into position when one of the notches 43 reaches a position below the loop 41.

Also in this form of my invention, one end of the spring 40 is inserted through an opening in the pin 44 which rotatably connects the spool case to the bracket so that the spring serves to hold these parts in assembled position, the convolutions of the springs allowing a certain amount of play between the spool case and the attaching bracket.

In the modified form of my invention shown in Figs. 7 to 9 inclusive, there is provided an attaching bracket 46 of a form similar to that previously described, which bracket is adapted to be attached to the rod in the usual manner. To this bracket the spool support or case 47 is hinged or pivoted as at 48 so as to swing from the position shown in Fig. 7 to the position shown in Fig. 8 to move the spool 49, rotatably supported in the case as before, from the reeling-in position shown in Fig. 7 to the spinning position shown in Fig. 8. It will be noted that in this instance also, the axis, upon which the spool is mounted, is swung from a position transverse to the rod as shown in Fig. 7 to a position substantially parallel with the rod as shown in Fig. 8, but that the spool, instead of being swung about an axis passing through the spool axis, is swung about an axis at one edge of the case. It will also be understood that the spool is rotatably mounted in the case in substantially the same manner as described in connection with Figs. 1 to 6.

In this form of my invention the attaching bracket 46 is provided with a slot 50 through which extends a resilient spring member 51 secured in the bracket at 51ª, which spring member is adapted to engage an outwardly displaced portion 52 on the back of the spool case to hold the reel in its spinning position as shown in Fig. 8 and prevent it swinging idly to and fro when in this position. Also lugs 53 may be struck from the bracket to engage the peripheral wall of the case 47 so that the spool and spool case will be held fairly rigidly between this lug and spring 51 in its spinning position.

To releasably hold the case 47 in its reeling-in position shown in Fig. 7, the attaching bracket is provided with a recess 54, and the spool case with a resilient catch member 55 which is designed, when the reel is in the position shown in Fig. 7, to pass through the opening 54 and become engaged with an edge thereof. The member 55 is resilient and may be disengaged or engaged with the attaching bracket merely by exerting sufficient pressure upon the spool case in the proper direction. However, when in the position shown in Fig. 7, it will be securely held while the reeling-in operation is performed. The peripheral wall of the case 47 may be provided with a slot 56 through which the line moves during the reeling-in operation.

It is sometimes desirable on reels of this character to provide mechanism for the level winding of the line upon the spool. I have shown such a device in Figs. 9 and 12 of the drawings wherein, adjacent the slot 56, a pair of ears 57 are struck up from the case, and have rotatably mounted therein pins 58 attached to a grooved roller 59 which rotates freely in the ears 57. This roller is provided with reversely directed helical grooves or channels 60 which are pitched in opposite directions so that the line, when entering the slot 56, will engage in one of these grooves and be carried by the rotation of the roller 59, due to the friction of the line, to one edge of the spool where it will be caught in the other groove and returned to the opposite edge, thus providing for the even or level winding of the line across the width of the spool to prevent the piling-up of the line in any one place.

While I have shown and described some preferred embodiments of my invention, it will be understood that it is not to be limited to all of the details shown, but is capable of modification and variation within the spirit of the invention and within the scope of the claims.

What I claim is:

1. A casting reel comprising a spool, a support upon which said spool is mounted, a bracket adapted to be attached to a rod, means pivotally securing said support to the bracket whereby the support may be rotated about an angle of 180°, means for releasably securing said support in positions at either end of its movement and in a position intermediate said end positions, the axis of said spool being parallel to the rod in said intermediate position, and a handle movably carried by the spool to project from either face thereof.

2. A casting reel comprising a spool, a support upon which said spool is mounted, a bracket adapted to be attached to a rod, means pivotally securing said support to the bracket whereby the support may be rotated about an angle of 180°, means for releasably securing said support in positions at either end of its movement and in a position intermediate said end positions, the axis of said spool being parallel to the rod in said intermediate position, and a handle slidably carried by the spool and movable relatively thereto in a direction parallel to the spool axis to project from either face of the spool.

TIMOTHY F. HORAN.

REFERENCES CITED

The following references are of record in the file of this patent:

UNITED STATES PATENTS

| Number | Name | Date |
|---|---|---|
| 477,196 | Wilcox | June 14, 1892 |
| 2,283,773 | Teitsma | May 19, 1942 |

FOREIGN PATENTS

| Number | Country | Date |
|---|---|---|
| 50,314 | Switzerland | Feb. 9, 1910 |
| 203,892 | Switzerland | July 1, 1939 |
| 385,769 | Great Britain | Jan. 5, 1933 |
| 649,232 | France | Dec. 19, 1928 |
| 813,087 | France | Mar. 25, 1937 |
| 840,575 | France | Apr. 27, 1939 |